United States Patent
Lin

(10) Patent No.: US 11,608,171 B2
(45) Date of Patent: Mar. 21, 2023

(54) LARGE DRONE

(71) Applicant: PSJ INTERNATIONAL LTD., Tortola (VG)

(72) Inventor: Ching-Fuh Lin, Taipei (TW)

(73) Assignee: PSJ International Ltd., Tortola (VG)

( * ) Notice: Subject to any disclaimer, the term of this patent is extended or adjusted under 35 U.S.C. 154(b) by 354 days.

(21) Appl. No.: 16/860,363

(22) Filed: Apr. 28, 2020

(65) Prior Publication Data
US 2021/0171194 A1 Jun. 10, 2021

(30) Foreign Application Priority Data
Dec. 9, 2019 (TW) .................................. 108144912

(51) Int. Cl.
| | |
|---|---|
| *B64C 39/02* | (2006.01) |
| *B64D 27/24* | (2006.01) |
| *B60L 8/00* | (2006.01) |
| *G05D 1/10* | (2006.01) |

(52) U.S. Cl.
CPC ............ *B64C 39/024* (2013.01); *B60L 8/003* (2013.01); *B64D 27/24* (2013.01); *G05D 1/101* (2013.01); *B60L 2200/10* (2013.01); *B64C 2201/027* (2013.01); *B64C 2201/042* (2013.01); *B64C 2201/108* (2013.01); *B64D 2211/00* (2013.01)

(58) Field of Classification Search
CPC ............ B64C 39/024; B64C 2201/027; B64C 2201/042; B64C 2201/108; B60L 8/003; B60L 2200/10; B60L 50/60; B60L 2220/42; B64D 27/24; B64D 2211/00; G05D 1/101; Y02T 10/64; Y02T 10/70; Y02T 10/7072
See application file for complete search history.

(56) References Cited

U.S. PATENT DOCUMENTS

| | | | |
|---|---|---|---|
| 9,630,713 B1 * | 4/2017 | Von Novak, III | ..... B64D 47/08 |
| 10,392,110 B2 * | 8/2019 | Lin | ........ B64D 27/24 |
| 2019/0161187 A1 * | 5/2019 | Lin | ......... H02S 20/30 |

FOREIGN PATENT DOCUMENTS

| | | | | |
|---|---|---|---|---|
| CN | 107187592 A | * | 9/2017 | |
| CN | 108041014 A | * | 5/2018 | ......... A01M 7/0032 |
| CN | 112918676 A | * | 6/2021 | ........... B64C 39/024 |

* cited by examiner

*Primary Examiner* — Valentina Xavier
(74) *Attorney, Agent, or Firm* — Donald E. Stout; Stout, Uxa & Buyan, LLP

(57) ABSTRACT

The invention discloses a large drone that is powered by solar energy. In addition, the drone includes a large, lightweight fuselage that not only keeps balance and stability but also reduces the required power during flight.

12 Claims, 3 Drawing Sheets

LARGE DRONE

CROSS-REFERENCE TO RELATED APPLICATIONS

The entire contents of Taiwan Patent Application No. 108144912, filed on Dec. 9, 2019, from which this application claims priority, are expressly incorporated herein by reference.

BACKGROUND OF THE INVENTION

1. Field of the Invention

The present invention relates to a large drone that is powered by solar energy and that is constructed to provide balance and stability during flight.

2. Description of Related Art

A multirotor is a rotorcraft with more than two rotors. An advantage of multirotor aircraft is the simpler rotor mechanics required for flight control. Generally, a distance between the centers of the one rotor and another is usually less than 60 cm. Because this type of drone has a short distance between rotors, it is easier to achieve stability and balance. However, if a distance between the centers of one rotor and another exceeds one meter (i.e., the distance between the center of the drone and the centers of the rotors exceeds fifty centimeters), a larger torque is resulted in and easily affected by fluctuations in the driving force of the motor and hence leading to a poor stability of the drone.

In order to improve the stability, a simple method is to increase the volume of the drone, such as making a bigger fuselage and thicker arms. For example, U.S. Patent Publication No. US20120091284 discloses an unmanned aerial vehicle comprising a hemispherical body, a brushless type electrical, a propeller, a plurality of wingtip devices, a plurality of servomotors and each of the plurality of the servomotors is connected to each of the plurality of the wingtip devices respectively, a plurality of carbon rods, and a casing. The brushless type electrical motor provides a lifting force for a Vertical take-off and landing (VTOL) and the plurality of wing tip devices are classified into three types of wing tip devices and the three types of wing tip devices are controlled by the respective servomotors to control yaw, pitch and roll movements thereby stabilizing and controlling the movement of the unmanned aerial vehicle.

Under the condition that the drone is constructed by using same materials, however, if the volume of the drone increases, the total weight of the drone also increases. And the lifting force of the drone is provided by the propeller driven by the motor and is proportional to the area of the drone ($F=(A\rho) v^2$).

In order to provide stability, the volume of the drone increases and the weight of the drone increases with the volume, and the required lifting force increases with the area. Therefore, a larger power is needed for large drones to fly against gravity.

SUMMARY OF THE INVENTION

The present invention relates to a large drone powered by solar energy and that can provide balance and stability during flight.

According to an embodiment of the present invention, a large drone comprises a fuselage, a plurality of propellers, a plurality of motors, a solar cell module, and a flight control device. The fuselage includes an upper layer and a lower layer. The upper layer comprises a plurality of horizontally arranged upper support rods. The lower layer comprises a plurality of horizontally arranged lower support rods, and the plurality of upper support rods correspond to the plurality of lower support rods. The propellers are respectively disposed at one end of the plurality of upper support rods. One motor is disposed under each of the propellers and to drive the corresponded propeller. The solar cell module is fixed above the upper layer and provides power for components of the large drone, such as the motors. The flight control device is used to control the flight and attitude of the drone. A distance between centers of the propellers is greater than 60 cm.

The large drones provided by embodiments of the present invention can be powered by solar energy. In addition, their large, light weight fuselages not only keep stability, but also reduce the required power during flight.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1:
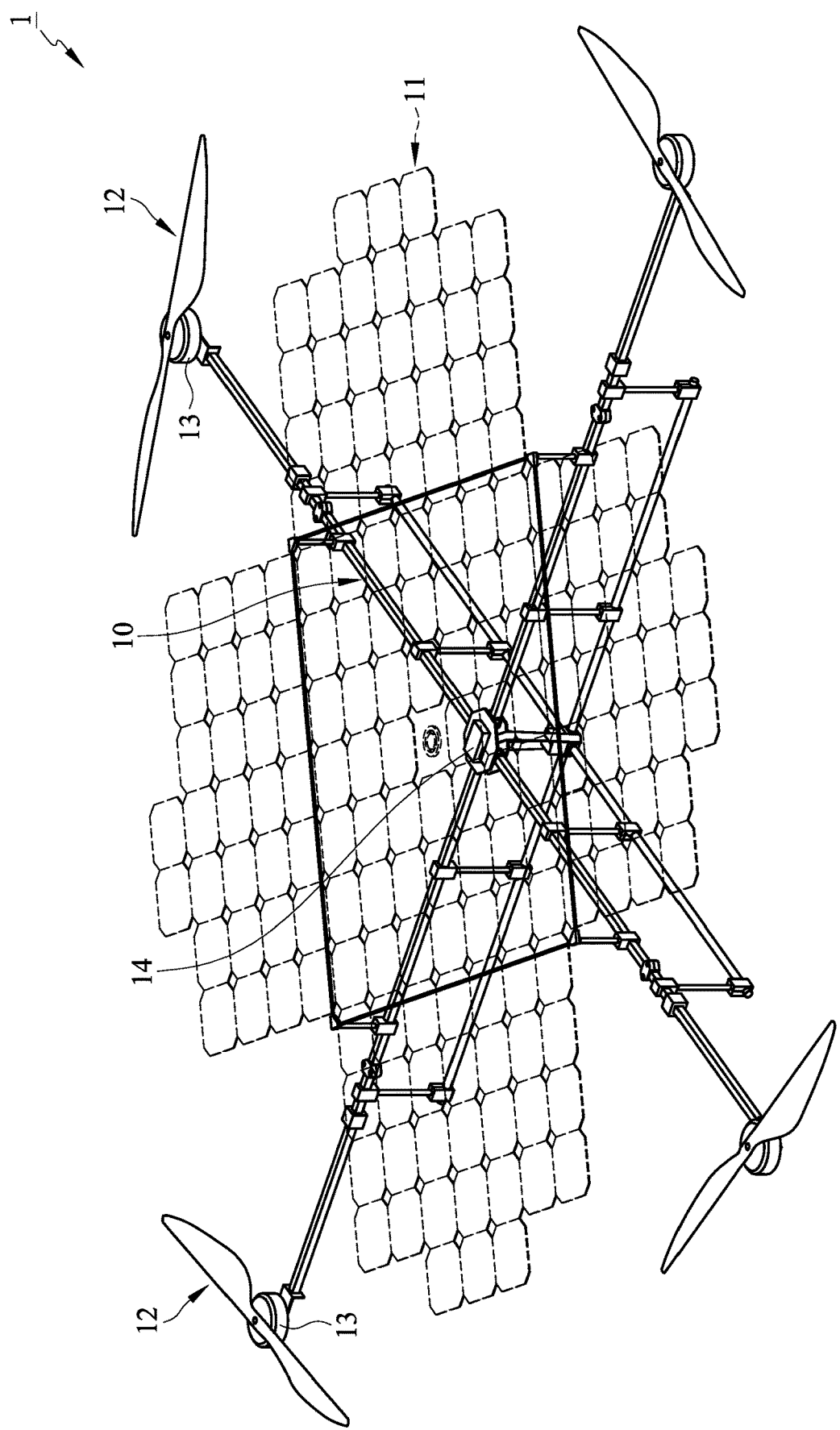
FIG. 1 is a perspective view of a drone in accordance with an embodiment of the present invention.
Figure 2:
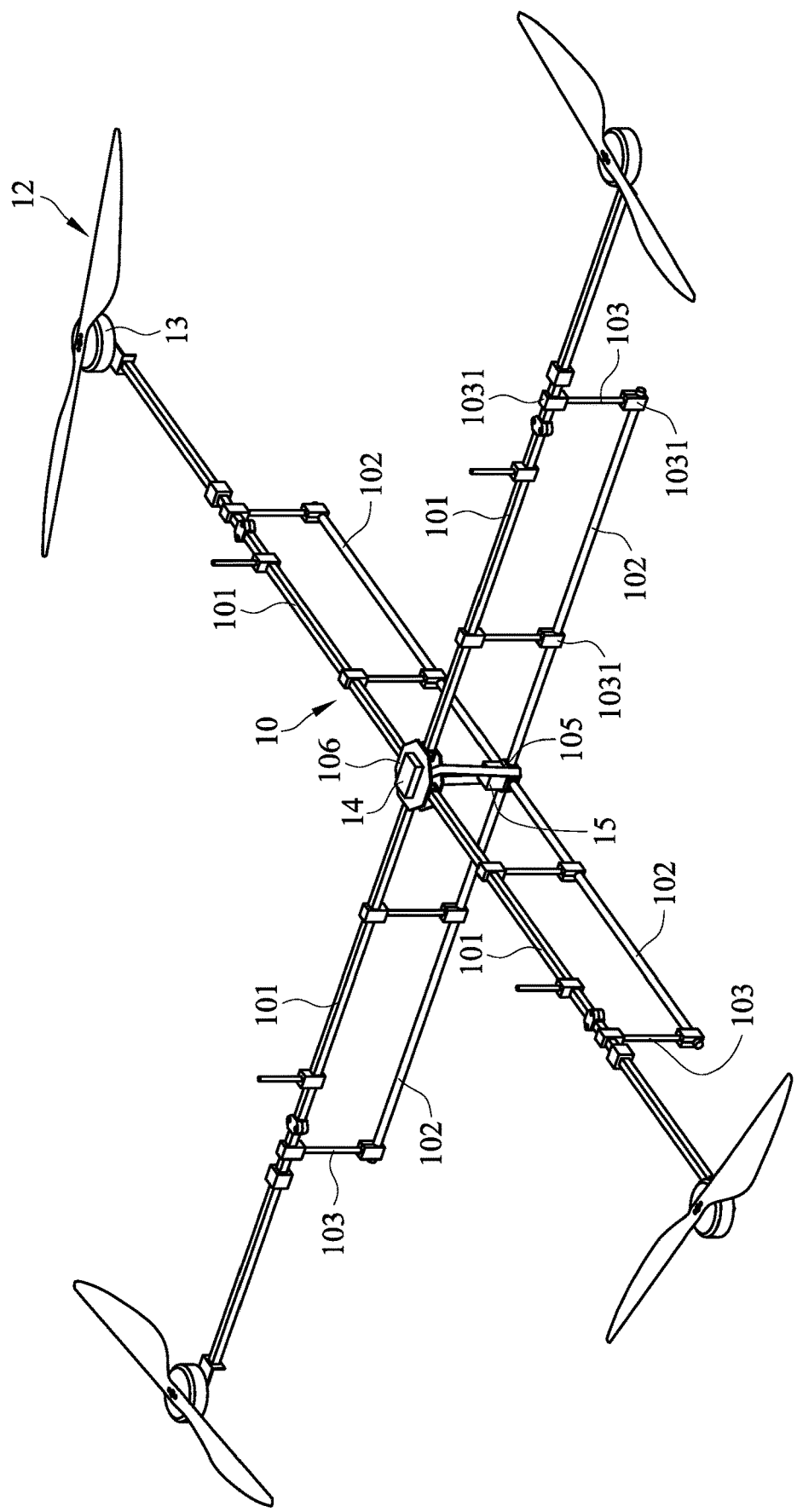
FIG. 2 is a perspective view of a drone in accordance with an embodiment of the present invention, wherein a solar cell module is omitted and not shown.
Figure 3:
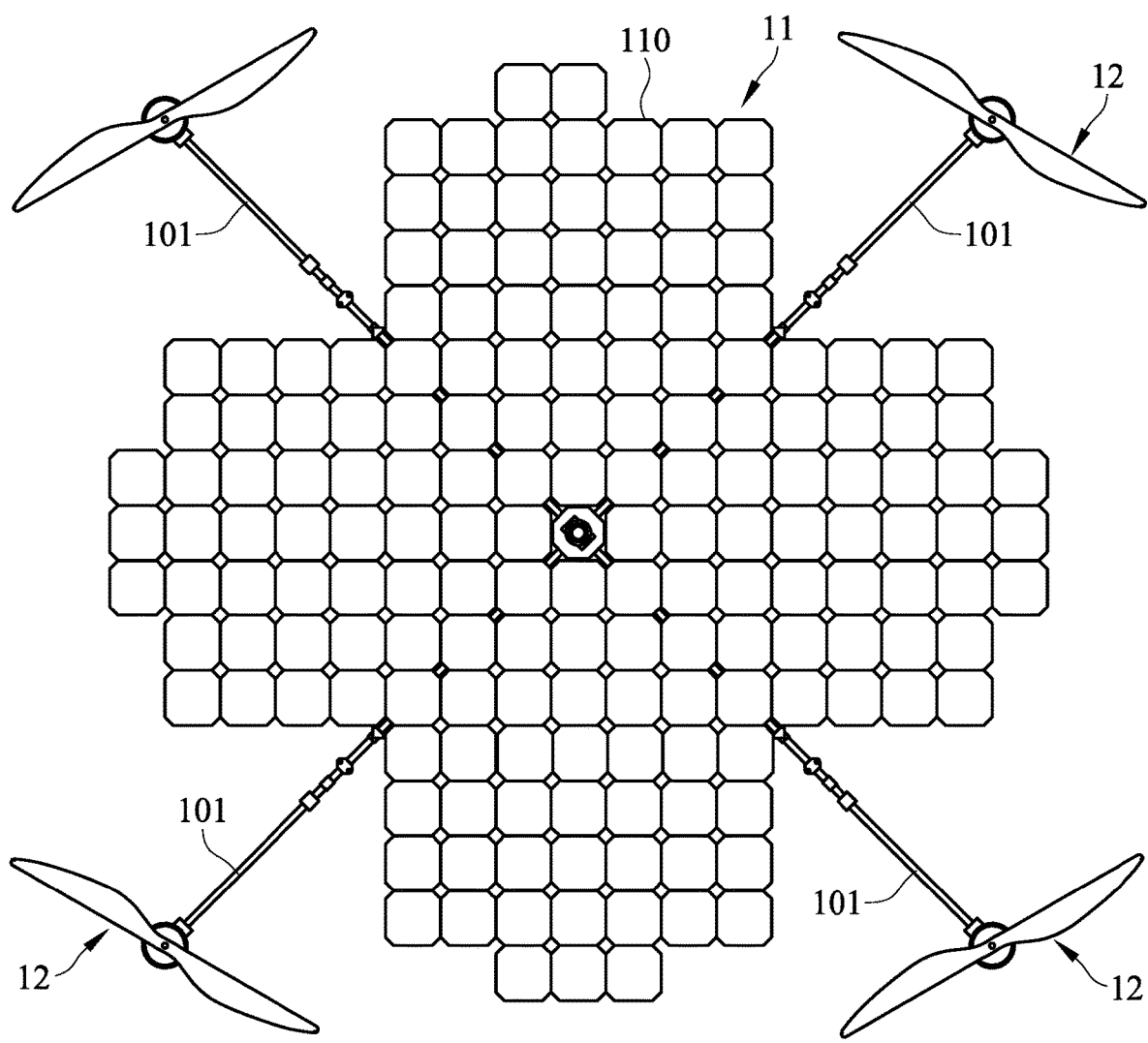
FIG. 3 is a top view of a drone in accordance with an embodiment of the present invention.

FIG. 1 is a perspective view of a drone 1 in accordance with an embodiment of the present invention. FIG. 2 is a perspective view of the drone 1 of FIG. 1 wherein a solar cell module 11 is not shown. FIG. 3 is a top view of the drone 1 in accordance with an embodiment of the present invention.

Referring to FIGS. 1 and 2, according to an embodiment of the present invention, the drone 1 mainly includes a fuselage 10, a solar cell module 11, a plurality of propellers 12, a plurality of motors 13, and a flight control device 14.

The fuselage 10 is a two-layered structure, including an upper layer and a lower layer. The upper layer is composed of a plurality of horizontally arranged upper support rods 101, and the lower layer is composed of a plurality of horizontally arranged lower support rods 102. Each upper support rod 101 corresponds to one lower support rod 102. Between a couple of upper support rod 101 and lower support rod 102, there are a plurality of longitudinal support rods 103, and the upper and lower ends of each longitudinal support rod 103 are respectively connected to the upper support rod 101 and the lower support rod 102. In this embodiment, the longitudinal support rod 103 is fixed with the upper support rod 101 and the lower support rod 102 through an attachment 1031, respectively, but it is not limited thereto. In this embodiment, preferably, both the number of the upper support rods 101 and the number of the lower support rods 102 are four. In other embodiments, the number of the upper support rods 101 and the number of the lower support rods 102 may be three to eight. A landing gear (not shown) may be further provided below the fuselage 10. Preferably, the upper support rods 101 and the lower support rods 102 are made of carbon fiber, but they may be made of other lightweight materials or composite materials.

The motor 13 may be electrically connected to the flight control device 14. The solar cell module 11 is fixed above the fuselage 10 and can be electrically connected to the flight control device 14. The solar cell module 11 includes a plurality of solar cells 110.

In some embodiments, the drone 1 may further include a backup battery 15. When the weather is bad or the intensity of sunlight is insufficient, the backup battery 15 can provide power for the drone 1 to fly. In one embodiment, the weight of the backup battery 15 is 400 g.

Referring to FIGS. 1 and 2, preferably, the center of the fuselage 10 may further include a lower support piece 105, and one ends of the lower support rods 102 are connected to the lower support piece 105. The lower support sheet 105 has a small area generally less than 10 cm². The backup battery 15 can be placed on the lower support sheet 105. This configuration makes the center of gravity of the drone 1 slightly adjusted downward, resulting in a better stability. In some embodiments, the center of the fuselage 10 may further include an upper support piece 106, and the flight control device 14 and the backup battery 15 are fixed to the upper support piece 106. In another embodiment, the upper support sheet 106 is omitted. The flight control device 14 may be mounted on the upper layer or the lower layer. The flight control device 14 is used to control the flight and attitude of the drone 1, and its weight typically is less than 30 g or even less than 10 g. The flight control device 14 may be electrically connected to the solar cell module 11, the motors 13, and the backup battery 15 and control these components.

In one embodiment, the solar cell module 11 and the backup battery 15 can supply 8S voltage (29.6V-33.6V). In one embodiment, the total weight of the fuselage 10, the plurality of propellers 12, the plurality of motors 13, and the flight control device 14 is 3500 g. In one embodiment, the solar cell module 11 includes one hundred and seventy-one solar cells 110. Each solar cell 110 has an area of 5 square inches (in²), and its generated power per unit weight (PWR) is equal to or greater than 0.275 (W/g). In one embodiment, the total weight of the solar cell module 11 is 1982 g. In some embodiments, the generated power per unit weight (PWR) of each solar cell is equal to or greater than 0.25 (W/g).

The number of the propellers 12 is equal to the number of the upper support rods 101, and is also equal to the number of the motors 13. Each propeller 12 is driven by one corresponded motor 13. In this embodiment, there are four propellers 12 and four motors 13. The propellers 12 are disposed at the terminals of the upper support rods 101, and the respective motors 13 are disposed below the propellers 12. In one embodiment, each propeller 12 is a two-bladed propeller made of carbon fiber, but it may be another number-bladed, such as a three-bladed propeller. In addition, the propellers 12 may be made of other lightweight materials or composite materials.

Referring to FIG. 3, "wheelbase" is defined herein as the maximum distance between the shafts of the plurality of propellers 12. In this embodiment, "wheelbase" is the distance between the shafts of the two propellers 12 arranged diagonally. In some embodiments, the wheelbase of drone 1 is greater than 60 cm. In some embodiments, the wheelbase of drone 1 is greater than 80 cm. In some embodiments, the wheelbase of drone 1 is greater than 160 cm. In a specific embodiment, the wheelbase of drone 1 is 235 cm.

In a preferred embodiment, the maximum distance between the upper layer and the lower layer is about ¼ of the wheelbase. In some embodiments, the distance between the upper layer and the lower layer is 1/24 to ½ of the wheelbase. More preferably, in some embodiments, the distance between the upper layer and the lower layer is 1/12 to ¼ of the wheelbase. In some embodiment, the wheelbase is 235 cm, and the distance from the upper layer to the lower layer is 15 to 25 cm.

In addition, experimental results found that when the wheelbase of the drone exceeds 60 cm or even one meter, the drone with the fuselage originally having a single layer structure is difficult to keep balance, and is liable to be overturned by wind during flight. By contrast, the drone with the double-layered fuselage provided by the present invention has a greatly improved stability.

The double-layered fuselage 10 of the present invention is characterized in that the length of the upper support rods 101 and the lower support rods 102 is determined by the size of the drone 1. The larger the size of the drone 1, the longer the length of the upper support rod 101 and the lower support rod 102. However, the total weight of the fuselage 10 does not increase much, so the power required for the drone 1 to fly is only slightly increased. In some embodiments, the total weight of the drone 1 is less than or equal to 3500 g (excluding the weight of the solar cell module 11). In some embodiments, the total weight of the drone 1 is less than or equal to 2000 g (excluding the weight of the solar cell module 11).

The double-layered fuselage 10 provided by the present invention is not necessary for a drone having a wheelbase less than 60 cm. Experiments found that for a small drone with the single-layer fuselage can keep stability during flight. For a large-scale, solar-powered multirotor, however, the drone 1 is liable to overturn during flight due to the large wind-receiving area of the solar cell module 11. By employing the double-layered fuselage 10, the volume of the drone 1 increase, while the total weight of the drone 1 is not increased much. Accordingly, the drone 1 can not only resist gravity, but also keep balance and stability during flight.

The intent accompanying this disclosure is to have each/ all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A large drone, comprising:
    a fuselage comprising:
        an upper layer comprising a plurality of upper support rods arranged horizontally; and
        a lower layer comprising a plurality of lower support rods arranged horizontally, wherein the plurality of upper support rods correspond to the plurality of lower support rods;
    a plurality of propellers respectively arranged at terminal ends of the plurality of upper support rods;
    a plurality of motors corresponding to the plurality of propellers, each motor being arranged under the corresponded propeller and driving the corresponded propeller;
    a solar cell module being fixed above and parallel to the upper layer to provide a power for the large drone to fly;
    a flight control device controlling a flight and an attitude of the large drone;
    wherein a wheelbase of the fuselage is greater than 60 cm, and the wheelbase is defined as a maximum distance between shafts of the plurality of propellers.

2. The large drone as recited in claim 1, wherein the wheelbase is greater than 80 cm.

3. The large drone as recited in claim 1, wherein the wheelbase is greater than 160 cm.

4. The large drone as recited in claim 1, wherein the fuselage further comprising a plurality of longitudinal support rods between each couple of one upper support rod and one lower support rod, and two ends of each of the longitudinal support rods are respectively connected the upper support rod and the lower support rod.

5. The large drone as recited in claim 1, wherein a distance between the upper layer and the lower layer is from 1/24 to 1/2 of the wheelbase.

6. The large drone as recited in claim 1, wherein a distance between the upper layer and the lower layer is from 1/12 to 1/4 of the wheelbase.

7. The large drone as recited in claim 1, wherein the number of the upper support rods, the number of the lower support rods, the number of the propellers, and the number of the motors are four.

8. The large drone as recited in claim 1, wherein the solar cell module comprises a plurality of solar cells, and a generated power per unit weight of each solar cell is greater than 0.25 W/g.

9. The large drone as recited in claim 1, wherein the plurality of upper support rods and the plurality of lower support rods are made of carbon fiber.

10. The large drone as recited in claim 1, wherein the large drone further comprises a backup battery, and the fuselage further comprises a lower support piece, and wherein one ends of the lower supporting rods are connected to the lower supporting piece, and the backup battery is disposed on the lower support sheet.

11. The large drone as recited in claim 1, further comprising an upper support piece, wherein the flight control device is fixed to the upper support piece.

12. The large drone as recited in claim 1, wherein a total weight of the large drone is less than or equal to 3500 g after deducting a weight of the solar cell module.

* * * * *